Nov. 14, 1967 — J. BURKE — 3,352,425
EYEGLASS FRAME DISPLAY STRUCTURE
Filed July 14, 1965 — 2 Sheets-Sheet 1

Jacob Burke
INVENTOR.

BY Clarence A. O'Brien
and Harvey B. Jacobson
Attorneys

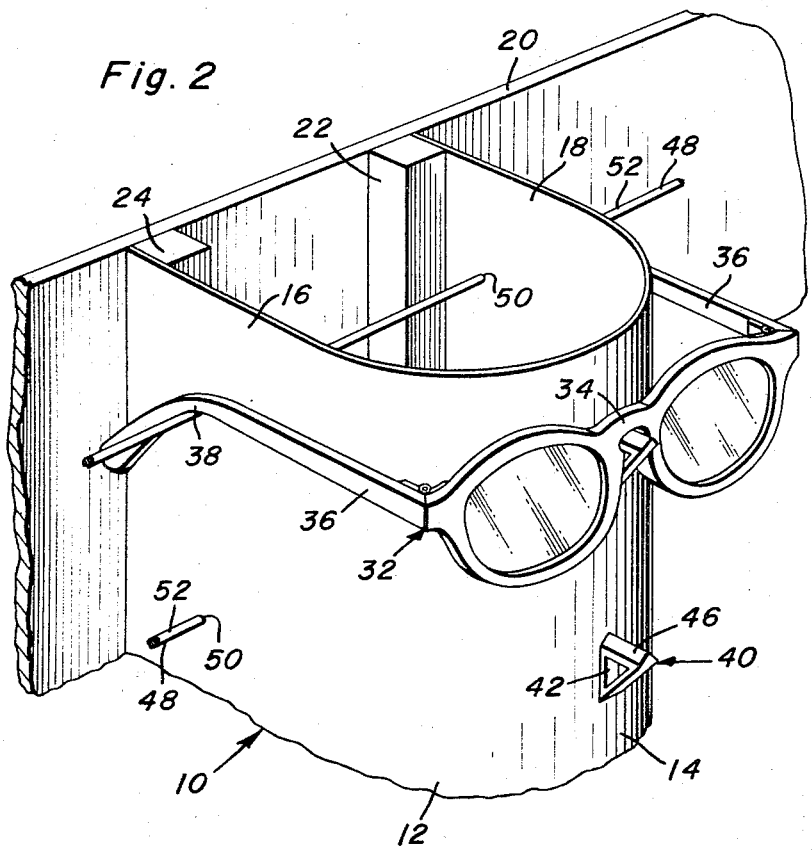
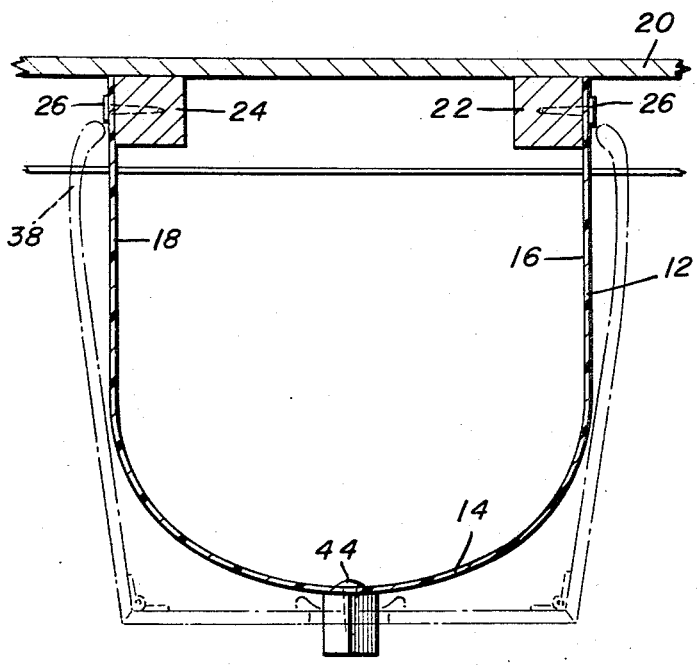

United States Patent Office 3,352,425
Patented Nov. 14, 1967

3,352,425
EYEGLASS FRAME DISPLAY STRUCTURE
Jacob Burke, Professional Bldg.,
East Grand Forks, Minn. 55744
Filed July 14, 1965, Ser. No. 471,981
10 Claims. (Cl. 211—13)

ABSTRACT OF THE DISCLOSURE

An upstanding member including a pair of opposite sides interconnected by means of an outwardly convexed curved front surface, vertically spaced forwardly projecting first support means on said front surface and vertically spaced pairs of second support means carried by said sides, said first and second support means being adapted to support the frame bridge and frame bows, respectively, of vertically spaced forwardly facing eyeglass frames.

---

This invention refers to display structure and more specifically to display structure for supporting eyeglass frames.

It is an object of this invention to provide structure for supporting a plurality of eyeglass frames in which the frames are shown in depth.

It is another object of the present invention to provide structure for supporting a plurality of eyeglass frames wherein the frames are supported to simulate the position of eyeglasses on the face.

In accordance with the above object it is a further object of the present invention to provide structure for supporting eyeglass frames so that the bow and temple portions are exhibited in open or natural position.

It is a still further object of the present invention to provide eyeglass frame support structure which highlights the natural color of the frames and which is simple to construct and to use.

It is a further object of the present invention to provide display supporting structure for eyeglass frames which may be fabricated out of readily available materials and when in use provides three-point support for the frames thereby minimizing the supporting surfaces required.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged perspective view partially broken away of the supporting structure illustrated in FIGURE 1;

FIGURE 3 is a horizontal cross-sectional view taken through the supporting structure illustrated in FIGURE 2.

Figure 1:
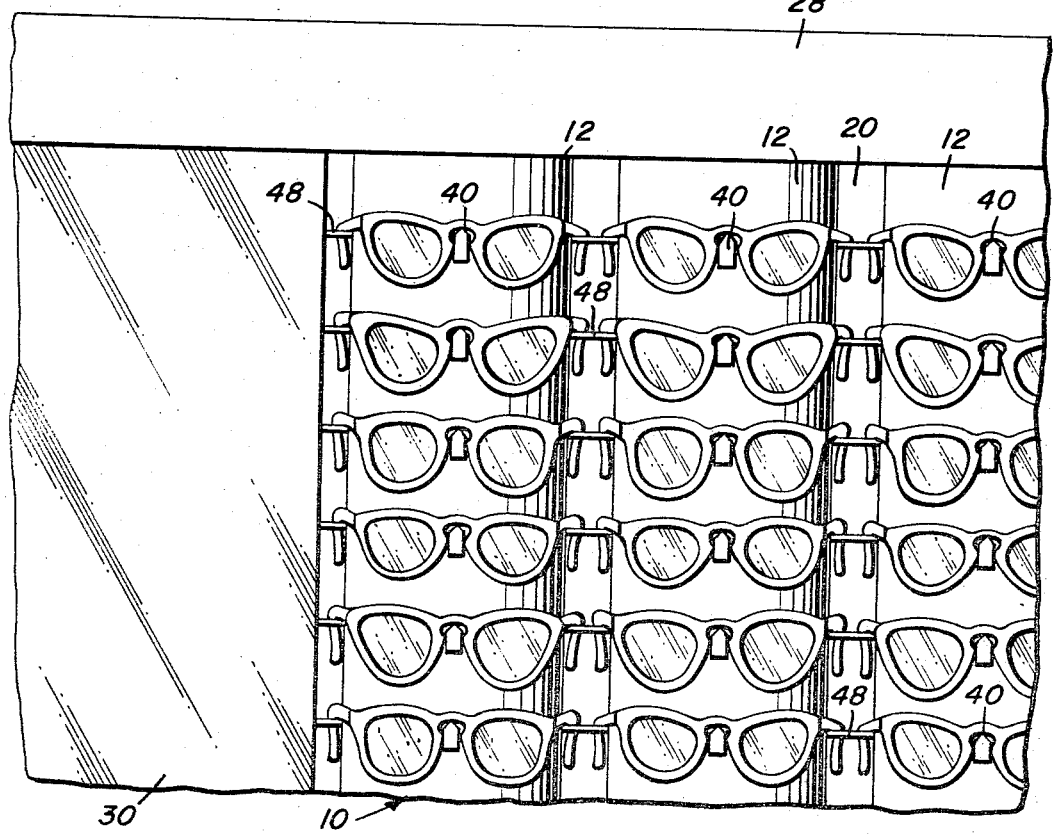
FIGURE 1 is a front elevational view illustrating a plurality of eyeglass frames mounted on the supporting structure comprising the present invention.

Referring now to the drawings, and particularly to FIGURES 1 through 3, reference numeral 10 refers generally to the supporting structure comprising the present invention. The supporting structure 10 is composed of an upstanding elongate U-shaped member 12, which is preferably fabricated from sheet plastic material of suitable color. The member 12 is, by virtue of its U-shaped configuration substantially sturdy, and quite capable of supporting a plurality of eyeglass frames. The U-shaped member 12 has a bight portion 14 and two substantially parallel walls 16 and 18. The member 12 may be mounted to surfaces such as a wall surface 20 by means of mounting blocks 22 and 24. As may be seen in FIGURE 3, the member 12 is fastened to the mounting blocks 22, 24 by fastening means such as tacks 26. The mounting blocks 22, 24 are then mounted in a conventional fashion to the wall surface 20 in vertical and parallel relationship, thereby providing a rigid support for the walls 16 and 18 of the member 12. As may be seen in FIGURE 1, top and side panels 28, 30 are provided to set off the mounting structure display panel 10, thereby giving it a pleasing appearance. Further, the member 12 is preferably white in color which color, together with a means for illumination such as neon lights (not illustrated) which are mounted under the panel 28, will highlight the natural color of the eyeglass frames.

An eyeglass frame such as frame 32 normally has a bridge area 34, a temple area 36 and a bow area 38. The member 12 has a plurality of eyeglass frame bridge supporting triangular members 40 spaced longitudinally along the mid region of the bight portion 14. These triangular members 40 include a first leg 42 which is fastened to the portion 14 as for example by the screw 44. The triangular member 40 also has a supporting leg portion 46 which extends outwardly from the bight portion 14 of the member 12 and provides a contact supporting surface for the bridge area 34 of an eyeglass frame. The member 12 has a plurality of bow supporting means such as wire members 48 spaced longitudinally along the wall portions 16 and 18 of the member 12. These wire members 48 are attached to the member 12 by being mounted through holes 50 in the walls 16 and 18. It is noted that the triangular members 40 which are attached to U-shaped member 12 all lie in a single vertical plane passing through the center of the member 12. The wire members 48 which are attached to the U-shaped member 12 are parallel and lie in a single vertical plane perpendicular to the above mentioned plane. Further, the upper leg supporting surface 46 of the triangular members 40 each correspond to and lie in the same plane as the upper surface 52 of the wire member 48. Thus, it is apparent that the contact supporting surfaces 46 and 52 are positioned to support an eyeglass frame 32 in a fully unfolded or open position and in a horizontal plane, thereby simulating the position of an eyeglass frame in place on a wearer's face. Further, the bridge area 34 of the frame 32 rests on the supporting surface 46 without the necessity of clips or other holding means, and the temple and bow areas 36 and 38 when in place over the wire member 48 naturally assume a contour about the member 12 similar to that when in place on the wearer's face.

Referring specifically to FIGURE 1, it may be seen that a plurality of U-shaped members 12 may be positioned in parallel upstanding relationship against a wall or supporting surface 20, the wire members 48 extending through the parallel walls 16 and 18 of each of said U-shaped members 12. This type of display creates an illusion of a larger number of eyeglass frames than are actually being displayed, and further the use of the wire member 48 extending through the walls of each of the U-shaped members 12 provides additional rigidity and stability for the members 12. Further, the wire members 48 are extended and fastened to the panel member 30 thereby adding to the rigidity and stability.

Figure 4:
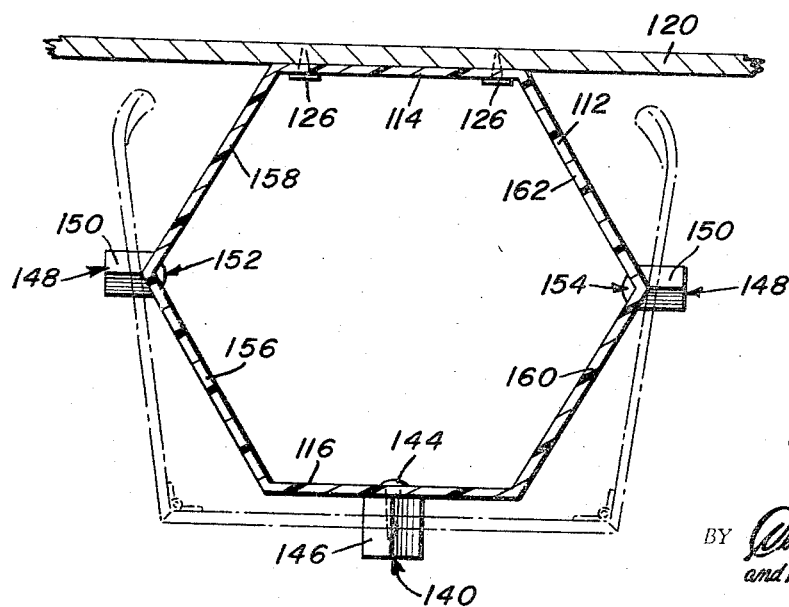
FIGURE 4 is a cross-sectional view similar to FIGURE 3 illustrating a modified form of the present invention.

Referring now to FIGURE 4, a modified form of the present invention is illustrated. In this modification, the U-shaped support member 12 is replaced by a hexagonal member 112, the hexagonal member being fabricated out of materials similar to those described above. The member 112 is hollow and elongate in construction, and has a first face 114 of its six faces mounted against a wall or other surface 120. This mounting is accomplished by conventional fastening means such as tacks or nails 126. On the wall 116 of member 112 opposite the mounting wall 114 is provided a plurality of triangular leg supporting members 140 spaced longitudinally along the wall 116. The triangular supporting members 140 are similar to the triangular members 40 described above and include an upper contact supporting surface 146. In this form of the invention, the wire members 48 are replaced by bow supporting triangular members 148 having upper leg contact supporting surfaces 150 for supporting the bow areas of eyeglass frames. These support means 148 are attached to the hexagonal member 112 at opposite corners 152 and 154 formed by the walls 156, 158, 160 and 162 which are included between the aforementioned walls 114 and 116. The bow supporting members 148 are attached to the hexagonal member 112 in a similar fashion as the bridge supporting member 140, described above. It will be appreciated further that a plurality of hexagonal members 112 may be mounted against the wall surface 120 in a similar manner as the members 12 as illustrated in FIGURE 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An eyeglass frame display device comprising means for supporting at least one frame in fully open and horizontal position, said support means including at least one bridge suporting means for contact support of an eyeglass frame bridge and at least one bow supporting means for contact support of an eyeglass frame bow, said bridge supporting means and bow supporting means having support contacting surfaces, said surfaces lying in a single horizontal plane whereby said frames can be supported in an open and horizontal position, said support means comprising an upstanding elongate U-shaped member, said member having a bottom portion and two substantially parallel wall portions, a plurality of said bridge supporting means spaced longitudinally along the mid region of said bottom portion, and a plurality of said bow supporting means spaced longitudinally along said wall portions.

2. Apparatus in accordance with claim 1 wherein said bridge supporting means comprises a triangular member, one leg of said triangular member being fastened to said bottom portion and the other leg of said triangular member comprising said support contacting surface, and said bow supporting means comprising a wire member, said wire member being positioned to extend through said parallel wall portions.

3. Apparatus in accordance with claim 2 and further including a plurality of said elongate U-shaped members positioned in parallel upstanding relationship and said wire members extending through the walls of each said U-shaped member.

4. An eyeglass frame display device comprising means for supporting at least one frame in fully open and horizontal position, said support means including at least one bridge supporting means for contact support of an eyeglass frame bridge and at least one bow supporting means for contact support of an eyeglass frame bow, said bridge supporting means and bow supporting means having support contacting surfaces, said surfaces lying in a single horizontal plane whereby said frames can be supported in an open and horizontal position, said support means comprising an upstanding elongate hexagonal member, said member being adapted for mounting at one face, a plurality of said bridge supporting means spaced longitudinally along the face of said hexagonal member parallel to said one face, and a plurality of said bow supporting means spaced longitudinally along opposing corners formed by the opposing pairs of walls included between said one face of said parallel base.

5. Apparatus in accordance with claim 4 wherein said bridge supporting means and said bow supporting means comprise triangular members, one leg of each triangular member being fastened to said upstanding member, and the other leg of said triangular member comprising said support contacting surface.

6. An eyeglass frame display device comprising an upstanding elongate hollow member, said member being adapted for mounting on a wall at one portion, said hollow member including at least one bridge supporting means for contact support of an eyeglass frame bridge mounted thereon and at least one bow supporting means for contact support of an eyeglass frame bow mounted thereon, said bridge supporting means and bow supporting means having support contacting surfaces, said surfaces lying in a single horizontal plane whereby said frame can be displayed in open and horizontal position.

7. Apparatus in accordance with claim 6 wherein said hollow member includes a plurality of said bridge supporting means spaced longitudinally along a portion furthermost from said one portion, and a plurality of said bow supporting means spaced longitudinally along the portion intermediate said one portion and said furthermost portion.

8. Apparatus in accordance with claim 7 wherein said bridge supporting means comprises a triangular member, one leg of said triangular member being fastened to said hollow member and the other leg of said triangular member comprising said support contacting surface, and said bow supporting means comprising a wire member, said wire member being positioned to extend through said intermediate portion.

9. Apparatus in accordance with claim 7 wherein said bridge supporting means and said bow supporting means comprise triangular members, one leg of each triangular member being fastened to said hollow member and the other leg of said triangular member comprising said support contacting surface.

10. Apparatus in accordance with claim 7 and further including a plurality of said elongate hollow members positioned in parallel upstanding relationship.

References Cited

UNITED STATES PATENTS

| | | | |
|---|---|---|---|
| 2,212,596 | 8/1940 | Fuller | 206—80 |
| 2,713,947 | 7/1955 | Foster | 211—13 |
| 2,764,286 | 9/1956 | Carmichael | 206—79 |
| 2,949,683 | 8/1960 | Glover | 35—49 |
| 3,123,208 | 3/1964 | Barnum et al. | 206—45.14 |

ROY D. FRAZIER, *Primary Examiner.*

CHANCELLOR E. HARRIS, *Examiner.*

K. J. WINGERT, *Assistant Examiner.*